(12) United States Patent
Van Bommel et al.

(10) Patent No.: US 12,352,407 B2
(45) Date of Patent: Jul. 8, 2025

(54) TRACK LIGHTING SYSTEM HAVING LED MODULE WITH LIGHT GUIDE ENCLOSING POWER TRACK

(71) Applicant: SIGNIFY HOLDING B.V., Eindhoven (NL)

(72) Inventors: Ties Van Bommel, Horst (NL); Robert Jacob Pet, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/725,878

(22) PCT Filed: Dec. 23, 2022

(86) PCT No.: PCT/EP2022/087728
§ 371 (c)(1),
(2) Date: Jul. 3, 2024

(87) PCT Pub. No.: WO2023/135006
PCT Pub. Date: Jul. 20, 2023

(65) Prior Publication Data
US 2025/0084972 A1    Mar. 13, 2025

(30) Foreign Application Priority Data

Jan. 11, 2022   (EP) .................................. 22150939

(51) Int. Cl.
*F21S 8/00*   (2006.01)
*F21V 21/005*   (2006.01)
*F21Y 115/10*   (2016.01)

(52) U.S. Cl.
CPC ............ *F21S 8/038* (2013.01); *F21V 21/005* (2013.01); *F21Y 2115/10* (2016.08)

(58) Field of Classification Search
CPC ........ F21S 8/038; F21V 21/005; F21V 5/002; F21V 7/005; F21Y 2115/10; F21Y 2103/10
See application file for complete search history.

(56) References Cited

U.S. PATENT DOCUMENTS 6,074,074 A * 6/2000 Marcus ..................... F21S 4/24
362/240
6,183,104 B1 * 2/2001 Ferrara ..................... F21V 3/00
362/249.06
(Continued)

FOREIGN PATENT DOCUMENTS

CN   107816708 A    3/2018
DE   102015118376 A1   5/2017
(Continued)

*Primary Examiner* — Ismael Negron (57) ABSTRACT

A lighting system includes an elongated power track connectable to a power supply, and a light emitting diode (LED) module configured to be connected to the power track. The LED module includes an elongated optical component and at least one LED light source. The optical component is arranged to at least partly enclose the power track when coupled to the LED module. The optical component includes a light in-coupling section facing the LED light source and configure to received light into the light component, and a light out-coupling section configured to couple light out of the optical component and direct the emission of light away from the power track.

14 Claims, 3 Drawing Sheets

(56) References Cited

U.S. PATENT DOCUMENTS

| | | | | |
|---|---|---|---|---|
| 6,837,598 B2* | 1/2005 | Marcus | ............... | F21V 21/002 362/244 |
| 8,858,051 B2* | 10/2014 | Riesebosch | ............ | F21V 21/34 362/555 |
| 8,926,134 B2* | 1/2015 | Hast | ...................... | F21V 21/34 362/249.02 |
| 9,927,114 B2* | 3/2018 | Dellock | ................ | F21V 29/74 |
| 10,451,229 B2* | 10/2019 | Keller | .................. | F21V 23/003 |
| 10,465,869 B2* | 11/2019 | Keller | .................... | F21S 8/006 |
| 11,131,446 B2* | 9/2021 | Béland | ..................... | F21S 8/04 |
| 2009/0279298 A1* | 11/2009 | Mier-Langner | ....... | F21V 21/096 362/373 |
| 2009/0296381 A1* | 12/2009 | Dubord | .................. | F21S 2/005 362/225 |
| 2013/0063963 A1 | 3/2013 | Riesebosch | | |
| 2013/0279160 A1 | 10/2013 | Myers et al. | | |
| 2019/0249854 A1* | 8/2019 | Shen | .................... | F21V 15/015 |
| 2021/0048152 A1 | 2/2021 | Parker et al. | | |
| 2022/0010955 A1* | 1/2022 | Katou | ................ | F21V 33/0064 |

FOREIGN PATENT DOCUMENTS

| | | | |
|---|---|---|---|
| EP | 3296627 A1 | 3/2018 | |
| JP | 2019106340 A | 6/2019 | |
| JP | 2020071999 A | 5/2020 | |

\* cited by examiner

TRACK LIGHTING SYSTEM HAVING LED MODULE WITH LIGHT GUIDE ENCLOSING POWER TRACK

CROSS-REFERENCE TO PRIOR APPLICATIONS

This application is the U.S. National Phase application under 35 U.S.C. § 371 of International Application No. PCT/EP2022/087728, filed on Dec. 23, 2022, which claims the benefit of European Patent Application No. 22150939.1, filed on Jan. 11, 2022. These applications are hereby incorporated by reference herein.

FIELD OF THE INVENTION

The present inventive concept relates to a track lighting system.

BACKGROUND OF THE INVENTION

Good lighting is of great importance, both in workspaces and in private homes. Having the right combination of ambient and direct light is one of the key aspects to a good lighting setup. To that purpose track lighting offers some advantages. By connecting multiple lights sources on one track while allowing different light projections in various directions, a more complete light profile can be obtained. However, this often requires ad hoc adjustment of the light sources, which can lead to inconsistency and less optimal settings. At the same time this type of light solution is less aesthetically pleasing, with visible tracks and more or less randomly positioned light sources along the tracks, which makes it less desirable for private and professional use alike.

US 2021/0048152 A1 discloses a LED lighting system providing combined directional and ambient lighting in which the lighting system may be part of a track system. The light output window along with the track lighting system on which the light sources are present is covered by a diffusive cover.

However, in the existing solutions the tracks may have a negative impact on the output light profile of the lighting device, leading to a light output not being uniform.

Therefore, it is desired to provide a track lighting solution enabling creating improved or optimal output light profiles, and thus a more uniform light output, while at the same time providing an aesthetically pleasing concept.

US 2013/063963 discloses an LED track-lighting system that includes an LED for emitting light. A light-transmitting element captures light emitted by the LED light and emits it over at least a portion of the track.

SUMMARY OF THE INVENTION

It is an object of the present invention to provide an enhanced lighting device, which offers a more optimal output lighting profile in an aesthetically pleasing way.

According to an aspect of the inventive concept there is provided a track lighting system comprising an elongated power track extending in a longitudinal direction and being connectable to a power supply, and a light emitting diode (LED) module, wherein the power track and the LED module are configured to be connected to one another, and wherein the power track is configured to provide electric output and to form a base for mounting the LED module to a surface, wherein the LED module comprises an elongated optical component extending in the longitudinal direction and an LED component with at least one integrated LED light source configured to, in operation, emit light, wherein the optical component is arranged to at least partly enclose the power track when the power track and the LED module are mechanically and electrically connected, wherein the optical component comprises a light in-coupling section facing the LED light source in the LED component when the power track and the LED module are mechanically and electrically connected, said light in-coupling section being configured to couple light emitted by the LED light source into the optical component, and wherein the optical component comprises a light out-coupling section configured to couple light out of the optical component and arranged and configured to direct the emission of light in directions away from the power track, when the power track and LED module are connected.

By providing such a track lighting system, and especially a track lighting system in which the optical component is arranged to at least party enclose the power track when the power track and the LED module are connected, the power track does not obscure the light which is emitted from the optical component and the output light profile is largely or fully unaffected by the presence of the power track. Furthermore, the optical component hides at least party, and preferably to a large degree especially fully, the power track from being visible by viewer.

Especially by providing that the optical component comprises a light in-coupling section facing the LED light source in the LED component when the power track and the LED module are connected, the light in-coupling section being configured to couple light emitted by the LED light source into the optical component, a light emitting device further allowing a wide variety of output light profiles from a single LED light source is provided for.

Especially by providing that the optical component comprises a light out-coupling section arranged and configured to direct the emission of light in directions away from the power track, when the power track and LED module are connected, a light emitting device is provided which allows further control of the output light profile. The light out-coupling section secures a low degree of interference between the output light profile and the power track.

Overall, a track lighting system with such features provides an enhanced output light profile compared to existing solutions particularly due to the power track of the system being at least party recessed inside the optical component and due to having light out-coupling in directions away from the power track.

In an embodiment of the invention the optical component is a light guide made of a transparent or translucent material and comprises light out-coupling elements configured to facilitate light out-coupling, wherein at least part of in-coupled light is light guided through the light guide via total internal reflection from the light in-coupling section to the light out-coupling section.

By having a light guide as the optical component an increased uniformity of the output light profile is achieved and the amount of light being lost or emitted in unwanted directions is lowered. By letting the optical component be a light guide the distribution of output light will be more uniform. A higher degree of control of output light profile will be obtained when using a light guide as the optical component, compared to e.g. a diffuser material.

In an embodiment, the optical component is configured to at least party enclose the LED component of the LED module.

Thereby, the interaction of the LED light source and light in-coupling in the optical component can be achieved unaffected by external light pollution. Additionally, by only having the LED component partly enclosed within the optical component, the construction allows for connection with a power track which is partly recessed in the surface on which it is mounted.

In an embodiment the LED component is fully accommodated in the optical component.

Thereby, the interaction of the LED light source and light in-coupling in the optical component can undergo even more unaffected by external light pollution.

In an embodiment, the optical component encloses the LED component in such a way that the LED component is fully recessed within the optical component, such as to hide the LED component inside the optical component.

In an embodiment the optical component is configured to enclose the power track in such a way that the power track is partly or fully arranged in a recess formed by the optical component.

By having the power track partly recessed inside the optical component the power track is partly hidden from sight. By having the power track partly recessed inside the optical component the power track will further have a low degree of interference with the output light profile from the optical component. An even higher degree of control with the output light profile will be obtained by having the power track fully recessed inside the optical component. By having the power track fully recessed by the optical component the power track will be fully hidden from sight.

In an embodiment, the LED component is at least partly recessed inside the power track.

By providing the power track with a recess in which the LED component of the LED module can be at least partly recessed in, the connection between the power track and LED module can be based on the friction between the two. Additionally, it allows for easy connection between the LED module and the power track. Another advantage is that the LED module can be easily exchanged if for example the LED light source has burned out. This configuration also allows for different positioning of the LED module along a power track. In an embodiment, the optical component comprises a U-shaped cross-section when seen in a cross-sectional view transverse to the longitudinal direction.

Thereby, the optical component will be provided with rounded corners which allows for a continuous light out-coupling section and thus higher light-output profile control.

In an embodiment the power track comprises a U-shaped cross-section when seen in a cross-sectional view transverse to the longitudinal direction.

Thereby is provided a power track design that will match a U-shaped optical component, thereby securing a good fit when the power track and LED module are connected.

In an embodiment, the light in-coupling section is recessed in the power track.

By having the light in-coupling section is recessed in the power track a higher degree of the emitted light will be captured by the light in-coupling and less light will go to waste. Thereby allowing for a more energy efficient track lighting system.

In an embodiment, when seen in a cross-sectional view transverse to the longitudinal direction, the power track is at least recessed 80%, at least 90%, or at least 95%, and most preferably fully recessed, in the optical component.

By having the power track recessed to a high degree (80%) and more preferably a higher degree (≥80%) the power track will be more hidden and will thus be less visible and have a lower degree of interaction with the light emitted by the optical component.

In an embodiment, the optical component comprises a recess facing towards the power track when the power track and the LED module are connected, the recess adapted for receiving or housing the LED light source and the recess comprises the light in-coupling section of the optical component.

Providing such a recess in the optical component facing towards the LED light source allows for an increased control of the amount of light captured from the light emitted by the LED light source by the optical component. The amount of received light emitted from the LED light source can be increased by having the LED light source housed in a recess formed by a recess of the optical component that faces towards the LED light source when the power track and LED module is connected.

By having the light in-coupling in the recess facing towards the LED light source allows for an increased control of light in-coupling of the light emitted by the LED light source.

In an embodiment, the power track comprises a mounting surface and has a first width $W_1$ parallel to the mounting surface seen in a cross-sectional view transverse to the longitudinal direction, and the optical component has a second width $W_2$ parallel to the mounting surface seen in a cross-sectional view transverse to the longitudinal direction, wherein $1.3*W_1 \geq W_2 \geq 1.1*W_1$, or $1.5*W_1 \geq W_2 \geq 1.05*W_1$, or $2*W_1 \geq W_2 \geq 1.01*W_1$.

By providing such a size ratio between the power track and the LED module, enables a functional and compact design of the track lighting system.

In an embodiment, the power track comprises a mounting surface configured for abutment with an external surface on which the power track is to be mounted, a first leg portion and a second leg portion substantially perpendicular to the mounting surface, wherein a first width $W_1$ is defined as the largest distance between the first leg portion and the second leg portion and measured between respective inner surfaces of the first and second leg portion, and wherein a second width $W_2$ is defined as the largest distance between sides of the optical component which at least partly enclose in the power track and measured between respective inner surfaces of the sides of the optical component, and wherein the first width and the second width are chosen such that $1.3*W_1 \geq W_2 \geq 1.1*W_1$, or $1.5*W_1 \geq W_2 > 1.05*W_1$, or $2*W_1 \geq W_2 \geq 1.01*W_1$.

Providing the widths $W_1$ and $W_2$ within one of these defined ranges secures a size ratio between the power track and the LED module that enables the emission of light from the optical component to at least partly hide the visibility of the power track from sight. In an embodiment, the power track has a first length and the LED module has a second length, where $L_1 \geq 2*L_2$, and where $L_2$ is at least 0.5 meter, at least 0.9 meter, at least 1.1 meter, or at least 1.2 meter.

Thereby the LED module of the track lighting system have a substantial size to provide a good light-output.

In an embodiment, the LED component comprises a controller and a heatsink in thermal contact with the LED light source, wherein the controller is configured to control one or more of the intensity, the color point and the correlated color temperature of the LED light source.

By providing the LED component with a controller a user will be able to adapt and control the intensity of the track lighting system. And by providing the LED component with a controller a user will be able to adapt and control the color point and/or correlated color temperature of the track lighting system. Thereby securing the possibility of the user to control and personalize settings of the system.

By providing the controller with an accompanying heatsink, the system will be able to remove excess heat and overheating of the system and in particular of the LED light sources is avoided.

In an embodiment, the LED component of the LED module comprises a plurality of integrated LED light sources.

By including multiple LED light sources in the LED component, a higher control of the out light profile is possible. Multiple LED light sources may give a more powerful light output from the lighting device. And, multiple LED light sources may allow for both direct and ambient light outputs from the lighting device.

In an embodiment, one or more centrally arranged LED light sources of the plurality of integrated LED light sources in the LED component of the LED module are arranged in a plane transverse to the longitudinal direction of the power track, and the one or more centrally arranged LED light sources is surrounded, in the said plane, by a least two surrounding peripheral LED light sources of the plurality of integrated LED light sources, where the one or more centrally arranged LED light sources are configured to, in operation, provide light with a first color temperature in a direction substantially perpendicular to the mounting surface of the power track, where the surrounding peripheral LED light sources are configured to, in operation, provide light with a second color temperature in a direction towards or parallel to the mounting surface of the power track, and wherein the first color temperature is higher than the second color temperature.

Thereby, a more complex light output profile is allowed for. By having a centrally arranged LED light sources surrounded, in the said plane, by a least two surrounding LED light sources an increased control of direct and ambient light outputs from the lighting device can be obtained.

In an embodiment, one or more centrally arranged LED light sources of the plurality of integrated LED light sources in the LED component of the LED module are arranged in a plane transverse to the longitudinal direction of the power track, and where the one or more centrally arranged LED light sources is surrounded, in the said plane, by a least two surrounding peripheral LED light sources, wherein the one or more centrally arranged LED light sources are configured to, in operation, provide light with a first color temperature in a direction substantially perpendicular to the surface on which the power track is mounted, and wherein the surrounding peripheral LED light sources are configured to, in operation, provide ultraviolet (UV) light in a direction towards or parallel to the mounting surface of the power track.

By providing an ultraviolet (UV) light output with certain wavelengths the light output from the lighting devices can have a disinfecting effect of the ambient environment, and in particular the ambient air. And especially by providing UV light in a direction towards or parallel to the mounting surface of the power track a disinfecting effect of the ambient environment can be achieved without risk of exposing humans or animals to undesired effects of UV light.

In an embodiment, the light guide comprises an optical barrier configured to separate and redirect light emitted by the one or more centrally arranged LED light sources of the plurality of integrated LED light sources and light emitted by the surrounding peripheral LED light sources of the plurality of integrated LED light sources.

By having an optical barrier separate the light emitted from one or more centrally arranged LED light sources of the plurality of integrated LED light sources and light emitted by the surrounding LED light sources of the plurality of integrated LED light sources, the lighting device can simultaneously obtain a directional "spot-light" effect and "ambient-light" effect.

In an embodiment, the optical barrier extends in an angle of about 45 degrees with the plane transverse to the longitudinal direction of the power track.

Thereby, a specific direction for the light emitted from one or more centrally arranged LED light sources of the plurality of integrated LED light sources is defined to create a spot-light effect in a direction perpendicular to the mounting surface of the power track, and light emitted by the surrounding LED light sources of the plurality of integrated LED light sources is separated out to redirect the light emitted by the surrounding LED light sources of the plurality of integrated LED light sources to the sides of the optical component, so as to create an ambient light effect in a particularly efficient manner.

In an embodiment, the track lighting system comprises one or more of a plurality of LED modules, wherein the plurality of LED modules are configured to be connected to the power track, and a plurality of power tracks configured to form a base for mounting at least one LED module to a surface.

By providing one or both of a plurality of LED modules, where the plurality of LED modules are configured to be connected to the power track, and a plurality of power tracks configured to form a base for mounting the LED module to a surface the possibility of personalized adjustment of the one or more plurality of LED modules configured to be connected to the same power track is provided for. Additionally, the possibility for a user to personalize the light output profiles created by the lighting device is also provided for.

In an embodiment, the optical component at least party encloses two adjacent power tracks.

Thereby providing for the possibility of hiding joints in a systems with at least two longitudinal adjacent power tracks.

In an embodiment, other types of lighting devices such as spotlights and/or downlights can be electrically and mechanically connected to the power track.

By providing a power track which is compatible with other types of lighting devices, a higher degree of freedom and individual adjustment is achieved for the user of the track lighting system.

The above and other objects are in a second aspect of the invention obtained by a track lighting system comprising one or more lighting devices according to any one of the above embodiments.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
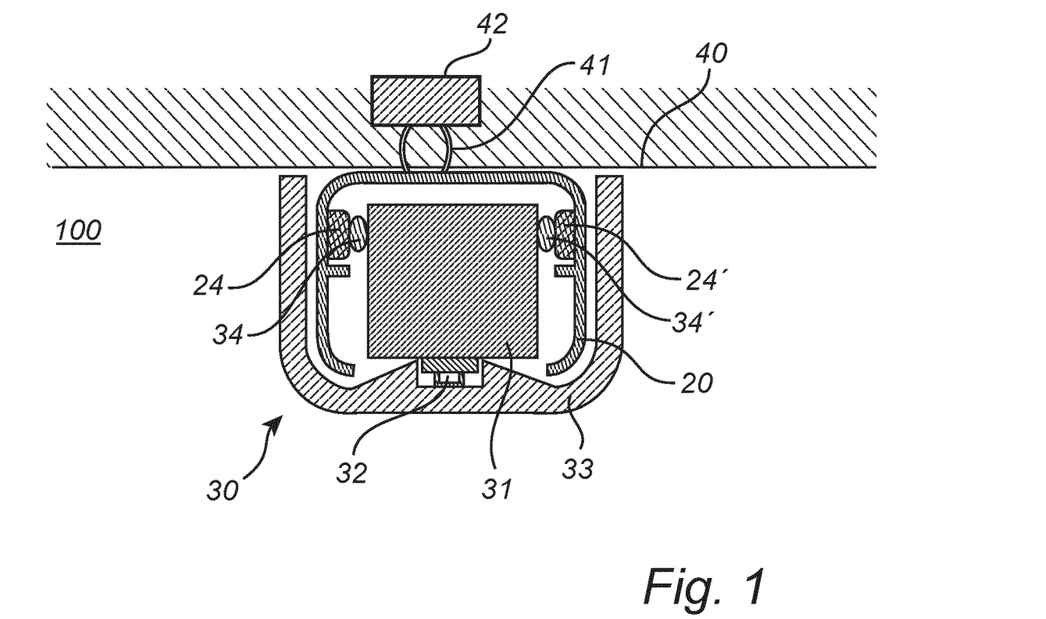
FIG. 1 shows a cross sectional view of a first embodiment of a track lighting system according to the invention comprising a power track and a LED module.
Figure 6:
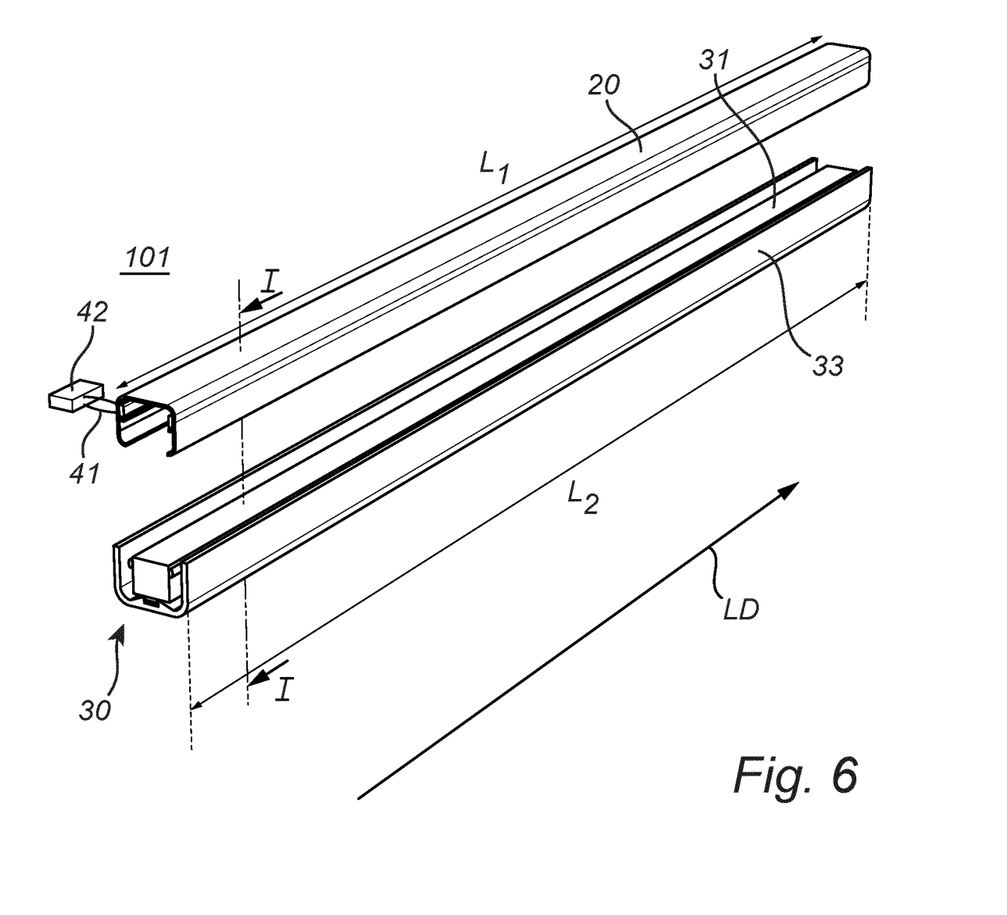
FIG. 6 shows a track lighting system according to a first embodiment of the invention, in a perspective view. The track lighting system comprises a power track and a LED module.

Referring to FIGS. 1 and 6, a track lighting system 100 according to the invention is shown in a schematic cross sectional view and in a perspective view, respectively.

The track lighting system 100 generally, and irrespective of the embodiment, comprises a power track 20, and a light emitting diode (LED) module 30. The power track 20 and LED module 30 are configured to be connected to one another. The power track 20 is configured to form a base for mounting the LED module 30 to an external surface 40, e.g. a ceiling or a wall. The power track 20 comprises a connection 41 to a power supply 42 such as to provide electrical power to the track lighting system 100 and in particular to the electrodes 24 and 24' of the power track 20 and the electrodes 34 and 34' of the LED module 30 and thus the LED light sources 32.

Figure 2:
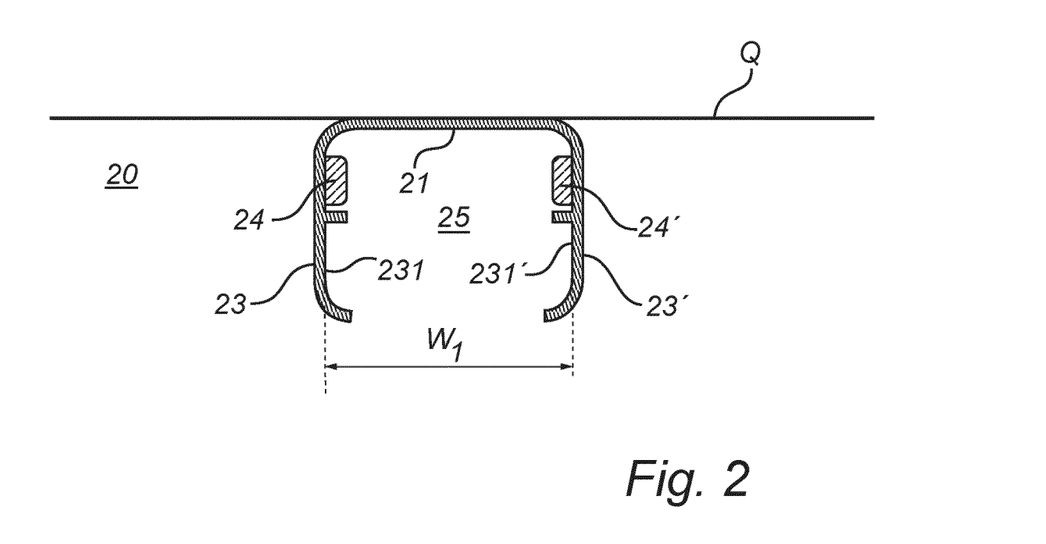
FIG. 2 shows a cross sectional view of a power track of a track lighting system according to the invention.

Reference is now also made to FIG. 2 which shows the power track 20 separated from the LED module 30. The power track 20 comprises a mounting surface 21 configured for abutment with an external surface 40 on which the power track is to be mounted. The power track 20 may further comprise a first leg portion 23 and a second leg portion 23'. The first leg portion 23 and the second leg portion 23' extend away from the mounting surface 21. In the embodiment shown, the first leg portion 23 and the second leg portion 23' further extend perpendicular to the mounting surface 21, and the mounting surface 21 is substantially parallel to the external surface 40. The mounting surface 21, the first leg portion 23 and the second leg portion 23' together form and partially enclose a recess 25, shaped and configured to receive a part of the LED module 30.

The precise shape of the recess 25, and thus the precise configuration of the mounting surface 21, the first leg portion 23, and the second leg portion 23', is not limited to the example shown on the figures, but may be adapted to conform with the shape, particularly the cross-sectional shape, of any given and feasible LED module 30 such as to enable receiving and safely holding at least a part of the LED module 30 within the recess 25.

However, irrespective of the embodiment, a first width $W_1$ is defined as the largest distance measured between and perpendicular to the first leg portion 23 and the second leg portion 23'. The first width $W_1$ is more particularly measured as the largest distance between and perpendicular to the inner surfaces 231 and 231' of the leg portions 23 and 23' of the power track 20, such that the measurement is inner surface 231 to inner surface 231'. Also, irrespective of the embodiment, and as shown on FIG. 3, a second width $W_2$ is defined as the largest distance measured between and perpendicular to the sides of the optical component 33 of the LED module 30. The second width $W_2$ is more particularly measured as the largest distance between and perpendicular to the inner surfaces 338 and 338' of the sides of the optical component 33, so that the measurement is inner surface 338 to inner surface 338'. The first width $W_1$ and the second width $W_2$ are chosen such that $1.5 * W_1 \geq W_2 > 1.05 * W_1$.

The first leg portion 23 comprises an electrode 24, and second leg portion 23' comprises another electrode 24', arranged such as to be brought into contact, particularly abutment, with complimentary electrodes 34, 34' comprised by the LED module 30 (cf. FIG. 1), when the power track 20 and the LED module 30 are connected. The electrodes 24, 24' and 34, 34' defines a closed power loop so as to provide the LED light sources 32 with power.

Figure 3:
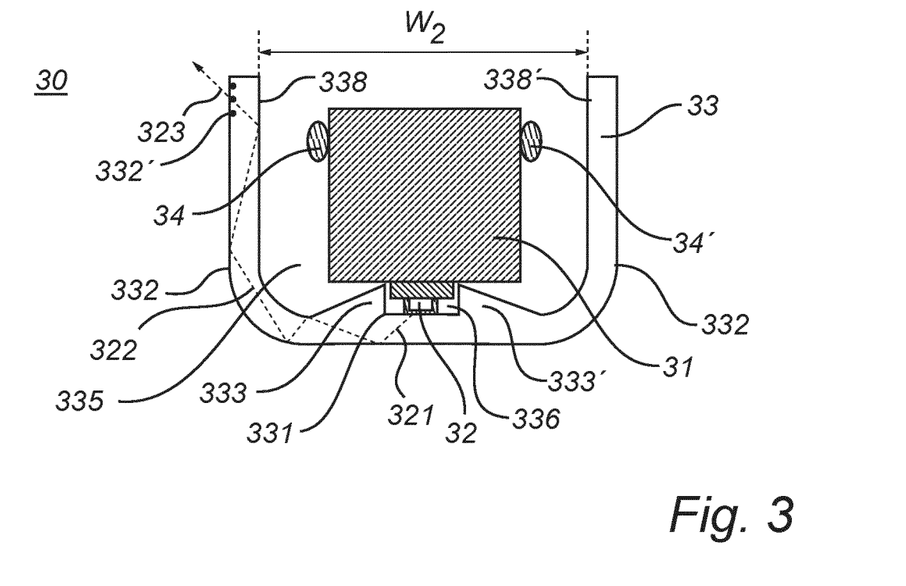
FIG. 3 shows a cross sectional view of a LED module of a track lighting system according to the invention.

Reference is now made to FIG. 3 which shows the LED module 30 separately from the power track 20. The LED module 30 generally comprises an LED component 31 with at least one integrated LED light source 32 and an optical component 33. The LED light source 32 is configured to, in operation, emit light. The LED module 30 may optionally be configured to be connectable to the power track 20 in such a way that the LED component 31 of the LED module is at least partly recessed inside the power track 20.

The optical component 33 may be arranged to enclose the power track 20 in such a way that the power track 20 is partly or fully arranged in a recess 335 formed by the optical component 33, when the power track 20 and the LED module 30 are connected. Thus, when the power track 20 and the LED module 30 are connected, the LED component 31 is arranged in the recess 25 formed by the power track 20, and thus inside the power track 20, while the power track 20 is arranged in the recess 335 formed by the optical component 33 of the LED module 30, such that the optical component 33 is arranged outside of the power track 20. Thus, the optical component 33 of the LED module 30 in this embodiment surrounds and hides the power track 20 from sight in the mounted condition (cf. FIG. 1).

The optical component 33 comprises a light in-coupling section 331 facing the LED light source 32 in the LED component 31 when the power track 20 and the LED module 30 are connected. The light in-coupling section 331 is configured to couple light 321 emitted by the LED light source 32 into the optical component 33. The optical component 33 further comprises a light out-coupling section 332 containing light out-coupling elements 332' arranged and configured to couple out and direct the light 322, propagating within the optical component, to form emission of light 323 in directions away from the power track 20, when the power track 20 and LED module 30 are connected. The optical component 33 may be configured to at least party enclose the LED component 31.

The optical component 33 may further and optionally be a light guide, and the light guide may optionally comprise one or both of at least one light in-coupling element arranged on the light in-coupling section 331 and at least one light out-coupling element 332 arranged on the light out-coupling section 332. At least a part of the light guide, especially the light out-coupling section 332, may also comprise a diffusing material. Alternatively, the optical component 33 can be a diffusor, or a transparent polymetric material, or a combination of transparent and opaque material.

The optical component 33 may also comprise a protrusion 333 facing towards the power track 20 when the power track 20 and the LED module 30 are connected, where the protrusion 333 comprises or forms a recess 336 adapted for receiving or housing the LED light source 32 of the LED module 30. If the optical component 33 has such a protrusion 333, the light in-coupling section 331 of the optical component 33 may be comprised in the protrusion 333 or the protrusion 333 may be formed in the light in-coupling section 331.

Figure 4:
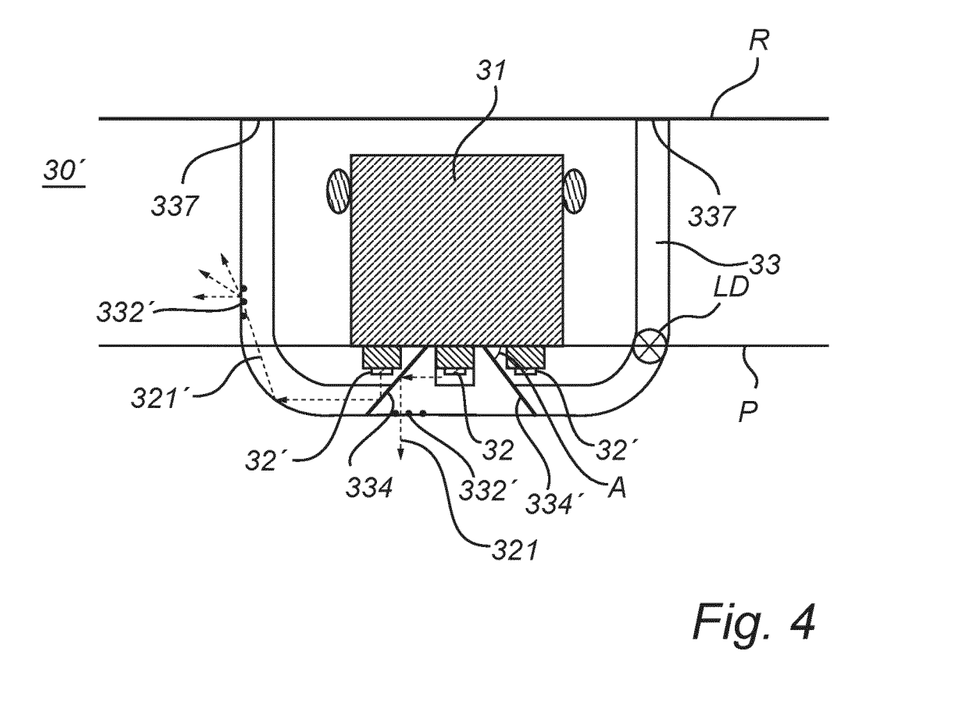
FIG. 4 shows a cross sectional view of a second embodiment of a LED module of a track lighting system according to the invention.
Figure 5:
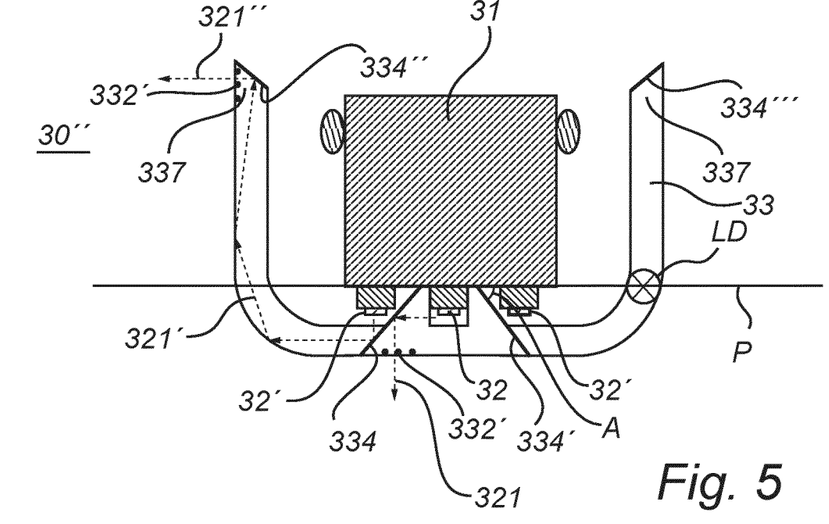
FIG. 5 shows a cross sectional view of a third embodiment of a LED module of a track lighting system according to the invention.

Referring to FIGS. 4 and 5, further exemplary and optional features of the LED component 31 and optical component 33, respectively, of the LED module 30 will be described.

The LED component 31 of the LED module 30' shown in FIG. 4 comprises a plurality of integrated LED light sources 32, 32'. The same applies to the LED component 31 of the LED module 30" shown in FIG. 5. The plurality of integrated LED light sources 32, 32', may be arranged as one or more centrally arranged LED light sources 32 surrounded by at least two peripheral LED light sources 32'. The plurality of integrated LED light sources 32, 32' in the LED component 31 of the LED module 30 are arranged in a plane P transverse to the longitudinal direction LD of the LED module 30' or 30", so that the one or more centrally arranged LED light sources 32 is surrounded, in the plane P, by the at least two surrounding LED light sources 32'. The one or more centrally arranged LED light sources 32 may, in operation, provide light with a first color temperature in a direction substantially perpendicular to the mounting surface 21 of the power track 20, and the surrounding peripheral LED light sources 32' may, in operation, provide light with a second color temperature in a direction towards or parallel to a plane Q in which the mounting surface 21 of the power track 20 extends (cf. FIG. 2), and in other words in a direction towards or parallel with a plane R in which ends or end surfaces 337 of the light out-coupling 332 section of the optical component 33 extend (cf. FIG. 4). The first color temperature may then be higher than the second color temperature. Alternatively, the first color temperature may be lower than the second color temperature. In an alternative embodiment, the surrounding peripheral LED light sources 32' may, in operation, provide ultraviolet (UV) light in a direction towards or parallel to a plane Q in which the mounting surface 21 of the power track 20 extends (cf. FIG. 2), and in other words in a direction towards or parallel with a plane R in which ends or end surfaces 337 of the light out-coupling 332 section of the optical component 33 extend (cf. FIG. 4).

Referring still to FIGS. 4 and 5, the optical component 33 is provided as a light guide and comprises an optical barrier 334, 334' configured to separate and redirect light 321 emitted by the one or more centrally arranged LED light sources 32 of the plurality of integrated LED light sources and light 321' emitted by the surrounding peripheral LED light sources 32' of the plurality of integrated LED light sources. The optical barrier 334, 334' may extend in an angle A of about 45 degrees to the plane P transverse to the longitudinal direction LD of the LED module 30' or 30".

Referring particularly to FIG. 5, the optical component 33 of the LED module 30" comprises further optical barriers 334", 334''' arranged at or near each ends of the light outcoupling section 332 of the optical component 33 opposite to the light in-coupling section 331 of the optical component 33. The respective further optical barrier 334", 334''' is configured to redirect light 321' emitted by the surrounding peripheral LED light sources 32' of the plurality of integrated LED light sources and guided through the optical component 33 to be emitted as light 321" directed in a direction away from the LED component 31. The further optical barrier 334", 334''' may extend in an angle of about 45 degrees to the plane P transverse to the longitudinal direction LD of the LED module 30".

Either of the optical barriers 334, 334' and further optical barriers 334" and 334''' may be internal optical barriers, i.e. arranged internally in the optical component 33. The further optical barriers 334" and 334''' may alternatively be external barriers, i.e. arranged at or on a surface of the optical component 33. In other or further embodiments, the lighting device 100 may also comprise one or more LED modules 30 that are configured to be connected to the same power track 20, and/or a plurality of power tracks 20 configured to form a base for mounting multiple LED modules 30 to one or more external surfaces 40.

Lastly reference is made to FIG. 6, which shows the track lighting system according in a perspective view. The track lighting system comprises a power track 20 having a length $L_1$ extending in a longitudinal direction LD and a LED module 30 having a length $L_2$ extending in the same longitudinal direction LD. The power track 20 of the track lighting system 100 is connected 41 to a power supply 42. A line II indicates a cross-sectional cut or view of the system corresponding to the view shown in all of FIGS. 1-5.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A track lighting system comprising:
   an elongated power track extending in a longitudinal direction and being connectable to a power supply, and
   a light emitting diode module,
   wherein the power track and the LED module are configured to be connected to one another, and
   wherein the power track is configured to provide electric output and to form a base for mounting the LED module to a surface,
   wherein the LED module comprises an elongated optical component extending in the longitudinal direction and an LED component with at least one integrated LED light source configured to, in operation, emit light,
   wherein the optical component is arranged to at least partly enclose the power track when the power track and the LED module are mechanically and electrically connected,
   wherein the optical component comprises a light in-coupling section facing the LED light source in the LED component when the power track and the LED module are mechanically and electrically connected, said light in-coupling section being configured to couple light emitted by the LED light source into the optical component, and wherein the optical component comprises a light out-coupling section configured to couple light out of the optical component and is arranged to direct the emission of light in directions away from the power track, when the power track and LED module are connected, and wherein the optical component is a light guide made of a transparent or translucent material and comprises light out-coupling elements configured to facilitate light out-coupling, wherein at least part of in-coupled light is light guided through the light guide via total internal reflection from the light in-coupling section to the light out-coupling section.

2. The track lighting system according to claim 1, wherein said optical component is configured to at least partly enclose the LED component of the LED module.

3. The track lighting system according to claim 1, wherein said LED component is fully accommodated in the optical component.

4. The track lighting system according to claim 1, wherein said LED component is at least partly recessed inside the power track.

5. The track lighting system according to claim 1, wherein the optical component comprises a U-shaped cross-section when seen in a cross-sectional view transverse to the longitudinal direction.

6. The track lighting system according to claim 1, wherein the power track comprises a U-shaped cross-section when seen in a cross-sectional view transverse to the longitudinal direction.

7. The track lighting system according to claim 1, wherein the light in-coupling section is recessed in the power track.

8. The track lighting system according to claim 1 wherein, when seen in a cross-sectional view transverse to the longitudinal direction, the power track is at least recessed 80% in the optical component.

9. The track lighting system according to claim 1, wherein the optical component comprises a recess facing towards the power track when the power track and the LED module are electrically and mechanically connected, said recess is adapted for receiving or housing the LED light source, and wherein said recess comprises the light in-coupling section of the optical component.

10. The track lighting system according to claim 1, wherein the power track comprises a mounting surface and has a first width parallel to the mounting surface seen in a cross-sectional view transverse to the longitudinal direction, and the optical component has a second width parallel to the mounting surface seen in a cross-sectional view transverse to the longitudinal direction, wherein $1.5*W_1 > W_2 > 1.05*W_1$.

11. The track light system according to claim 1, wherein the power track has a first length and the LED module has a second length, wherein $L_1 > 2*L_2$, and wherein $L_2$ is at least 0.5 meter.

12. The track light system according to claim 1, wherein the LED component comprises a controller and a heatsink in thermal contact with the LED light source, wherein the controller is configured to control one or more of the intensity, the color point and the correlated color temperature of said LED light source.

13. The track lighting system according to claim 1, and comprising one or more of:
 a plurality of LED modules, wherein the plurality of LED modules are configured to be connected to the power track, and
 a plurality of power tracks configured to form a base for mounting at least one LED module to a surface.

14. The track lighting system according to claim 13, wherein said optical component at least party encloses two adjacent power tracks.

* * * * *